US012812704B2

(12) United States Patent
Tesanovic et al.

(10) Patent No.: US 12,812,704 B2
(45) Date of Patent: Nov. 24, 2026

(54) HANDLING UNEXPECTED CONFIGURATION CASES IN A SIDELINK RELAY NETWORK IN A WIRELESS COMMUNICATION SYSTEM

(71) Applicant: Samsung Electronics Co., Ltd., Suwon-si (KR)

(72) Inventors: Milos Tesanovic, Staines (GB); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 18/169,135

(22) Filed: Feb. 14, 2023

(65) Prior Publication Data

US 2023/0262795 A1 Aug. 17, 2023

(30) Foreign Application Priority Data

Feb. 14, 2022 (GB) .................................... 2201895
Feb. 14, 2022 (GB) .................................... 2201917
Feb. 6, 2023 (GB) .................................... 2301636

(51) Int. Cl.
*H04W 76/14* (2018.01)

(52) U.S. Cl.
CPC .................................. *H04W 76/14* (2018.02)

(58) Field of Classification Search
None
See application file for complete search history.

(56) References Cited

U.S. PATENT DOCUMENTS 11,665,709 B1 * 5/2023 Pan ...................... H04W 72/25 370/329
2018/0077608 A1 3/2018 Jung et al.
2021/0204274 A1 7/2021 Paladugu et al.
2024/0080708 A1 * 3/2024 Rao .................. H04W 28/0268
2024/0187331 A1 * 6/2024 Ding ..................... H04W 76/12
2024/0223311 A1 * 7/2024 Lu ........................ H04W 72/40
2024/0260075 A1 * 8/2024 Paladugu ............. H04W 76/14
2024/0381452 A1 * 11/2024 Fujishiro .............. H04W 88/04
2025/0227662 A1 * 7/2025 Orsino ................ H04W 36/033

FOREIGN PATENT DOCUMENTS

EP 4247101 A1 9/2023
EP 4395380 A1 7/2024
WO 2021138868 A1 7/2021

OTHER PUBLICATIONS

International Search Report and Written Opinion of the International Searching Authority dated Jun. 9, 2023, in connection with International Application No. PCT/KR2023/002166, 8 pages.

(Continued)

*Primary Examiner* — Jae Y Lee
*Assistant Examiner* — Nhu Pham

(57) ABSTRACT

A method of handling communication in a sidelink relay network, including a remote UE and a relay UE, the method comprising: handling, by the remote UE and/or the relay UE, an error and/or a misconfiguration; obtaining a protocol data unit (PDU); and identifying whether at least one of a UE identity included in the PDU or a bearer identity included in the PDU matches with a configuration of the remote UE.

4 Claims, 9 Drawing Sheets

(56) References Cited

OTHER PUBLICATIONS

3GPP TS 38.351 V0.3.0 (Jan. 2022), Technical Specification, 3rd Generation Partnership Project; Technical Specification Group Radio Access Network; NR; Sidelink Relay Adaptation Protocol (SRAP) Specification (Release 17), 20 pages.
Nokia, et al., "Stage 2 corrections for SL Relay," R2-2200944, 3GPP TSG-RAN WG2 Meeting #116bis Electronic, Jan. 17-25, 2022, 10 pages.
OPPO, "Summary of [626]," R2-220xxx, 3GPP TSG-RAN WG2 Meeting #116bis-e, Electronic, Jan. 2022, 7 pages.
Supplementary European Search Report dated Mar. 28, 2025, in connection with European Application No. 23753262.7, 9 pages.
Combined Search and Examination Report dated Aug. 1, 2023, in connection with United Kingdom Patent Application No. GB2301636.3, 6 pages.
OPPO, "Left issues for adaptation layer", R2-2200363, 3GPP TSG-RAN WG2 #116bis-e, E-meeting, Jan. 2022, 4 pages.
Communication pursuant to Article 94(3) EPC dated Oct. 13, 2025, in connection with European Application No. 23753262.7, 6 pages.
Office Action issued Mar. 16, 2026, in connection with European Patent Application No. 23753262.7, 6 pages.
Action issued Aug. 4, 2026, in connection with European Patent Application No. 23753262.7, 8 pages.

* cited by examiner

HANDLING UNEXPECTED CONFIGURATION CASES IN A SIDELINK RELAY NETWORK IN A WIRELESS COMMUNICATION SYSTEM

CROSS-REFERENCE TO RELATED APPLICATIONS

This application is based on and claims priority under 35 U.S.C. § 119 to United Kingdom Patent Application No. 2201895.6, filed Feb. 14, 2022, United Kingdom Patent Application No. 2201917.8, filed Feb. 14, 2022, and United Kingdom Patent Application No. 2301636.3, filed Feb. 6, 2023, in the United Kingdom Intellectual Property Office, the disclosures of which are incorporated by reference herein in their entirety.

BACKGROUND

1. Field

Embodiment disclosed herein relate to wireless communication systems, (or mobile communication systems), and more particularly to sidelink relay networks, for example to handling configuration cases in sidelink relay networks in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service-based architecture or service-based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Embodiments disclosed herein provide an apparatus and a method for effectively providing a service in a wireless communication system.

SUMMARY

A first aspect provides a method of handling communication in a sidelink relay network, including a remote UE and a relay UE, the method comprising:

handling, by the remote UE and/or the relay UE, an error and/or a misconfiguration.

A second aspect provides a sidelink relay network, including a remote UE and a relay UE, configured to implement a method according to the first aspect.

According to the present disclosure there is provided a method, as set forth in the appended claims. Also provided is a network. Other features of the present disclosure will be apparent from the dependent claims, and the description that follows.

The first aspect provides a method of handling communication in a sidelink relay network, including a remote UE and a relay UE, the method comprising:

handling, by the remote UE and/or the Relay UE, an error and/or a misconfiguration.

In one example, handling, by the remote UE and/or the relay UE, the error and/or the misconfiguration comprises discarding, by the remote UE, a packet received thereby if a UE ID of the packet does not match the ID of the remote UE.

In one example, handling, by the remote UE and/or the relay UE, the error and/or the misconfiguration comprises discarding, by the remote UE, a packet received thereby if a bearer ID of the packet does not match a bearer for the remote UE.

In one example, handling, by the remote UE and/or the relay UE, the error and/or the misconfiguration comprises discarding, by the relay UE, a packet received thereby if a UE ID of the packet is not included in a configuration table.

In one example, handling, by the remote UE and/or the relay UE, the error and/or the misconfiguration comprises discarding, by the relay UE, a packet received thereby if a UE ID of the packet is included in a configuration table and if a bearer ID of the packet does not match a bearer included in the configuration table for the UE ID.

In one example, handling, by the remote UE and/or the relay UE, the error and/or the misconfiguration comprises sending, by the relay UE, a packet received thereby on a default channel if a UE ID of the packet is included in a configuration table and if a bearer ID of the packet does not match a bearer included in the configuration table for the UE ID.

In one example, the default channel is a dedicated, pre-configured and/or configurable mapping between an RLC channel ID (i.e., the default channel) and one or more E2E bearer IDs.

In one example, handling, by the remote UE and/or the relay UE, the error and/or the misconfiguration comprises sending, by the relay UE, a packet received thereby on a channel selected based on prioritization if a UE ID of the packet is included in a configuration table and if a bearer ID of the packet matches a plurality of bearers included in the configuration table for the UE ID.

In one example, handling, by the remote UE and/or the relay UE, the error and/or the misconfiguration comprises sending, by the relay UE, a packet received thereby on a channel selected randomly if a UE ID of the packet is included in a configuration table and if a bearer ID of the packet matches a plurality of bearers included in the configuration table for the UE ID.

In one example, handling, by the remote UE and/or the relay UE, the error and/or the misconfiguration comprises sending, by the relay UE, a packet received thereby on a channel selected based on QoS requirements if a UE ID of the packet is included in a configuration table and if a bearer ID of the packet matches a plurality of bearers included in the configuration table for the UE ID.

In one example, handling, by the remote UE and/or the relay UE, the error and/or the misconfiguration comprises selectively discarding, by the relay UE, a packet received thereby if a UE ID of the packet is included in a configuration table and if a bearer ID of the packet matches a bearer included in the configuration table for the UE ID and if a determined egress link is in RLF or congested.

In one example, handling, by the remote UE and/or the relay UE, the error and/or the misconfiguration comprises discarding, by the relay UE, a packet received thereby if a UE ID of the packet is included in a configuration table and if a bearer ID of the packet matches a bearer included in the configuration table for the UE ID and if the relay UE is to change its serving cell, for example due to RRCReconfiguration.

In one example, handling, by the remote UE and/or the relay UE, the error and/or the misconfiguration comprises removing, by the relay UE, a configuration table upon Uu RLF detection/notification or upon reception of an RRCReconfiguration including the reconfigurationWithSync.

In one example, handling, by the remote UE and/or the relay UE, the error and/or the misconfiguration comprises forwarding, by the relay UE, a buffered packet before removing, by the relay UE, a configuration table.

In one example, handling, by the remote UE and/or the relay UE, the error and/or the misconfiguration comprises re-routing via a different remote UE, by the relay UE, a packet received thereby if a UE ID of the packet is included in a configuration table and if a bearer ID of the packet matches a bearer included in the configuration table for the UE ID and if a determined egress link is in RLF or if the relay UE is to change its serving cell, for example due to RRCReconfiguration.

In one example, handling, by the remote UE and/or the relay UE, the error and/or the misconfiguration comprises releasing, at the relay UE, a SRAP entity.

The second aspect provides a sidelink relay network, including a remote UE and a relay UE, configured to implement a method according to the first aspect.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

According to various embodiments of the disclosure, handling unexpected configuration cases in a sidelink relay network can be efficiently enhanced.

Before undertaking the DETAILED DESCRIPTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a better understanding of the present disclosure, and to show how exemplary embodiments of the same may be brought into effect, reference will be made, by way of example only, to the accompanying diagrammatic Figures, in which.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the present disclosure, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of," and also may also be taken to include the meaning "consists of" or "consisting of."

The optional features set out herein may be used either individually or in combination with each other where appropriate and particularly in the combinations as set out in the accompanying claims. The optional features for each aspect or exemplary embodiment of the present disclosure, as set out herein are also applicable to all other aspects or exemplary embodiments of the present disclosure, where appropriate. In other words, the skilled person reading this specification should consider the optional features for each aspect or exemplary embodiment of the present disclosure as interchangeable and combinable between different aspects and exemplary embodiments.

Figure 1:
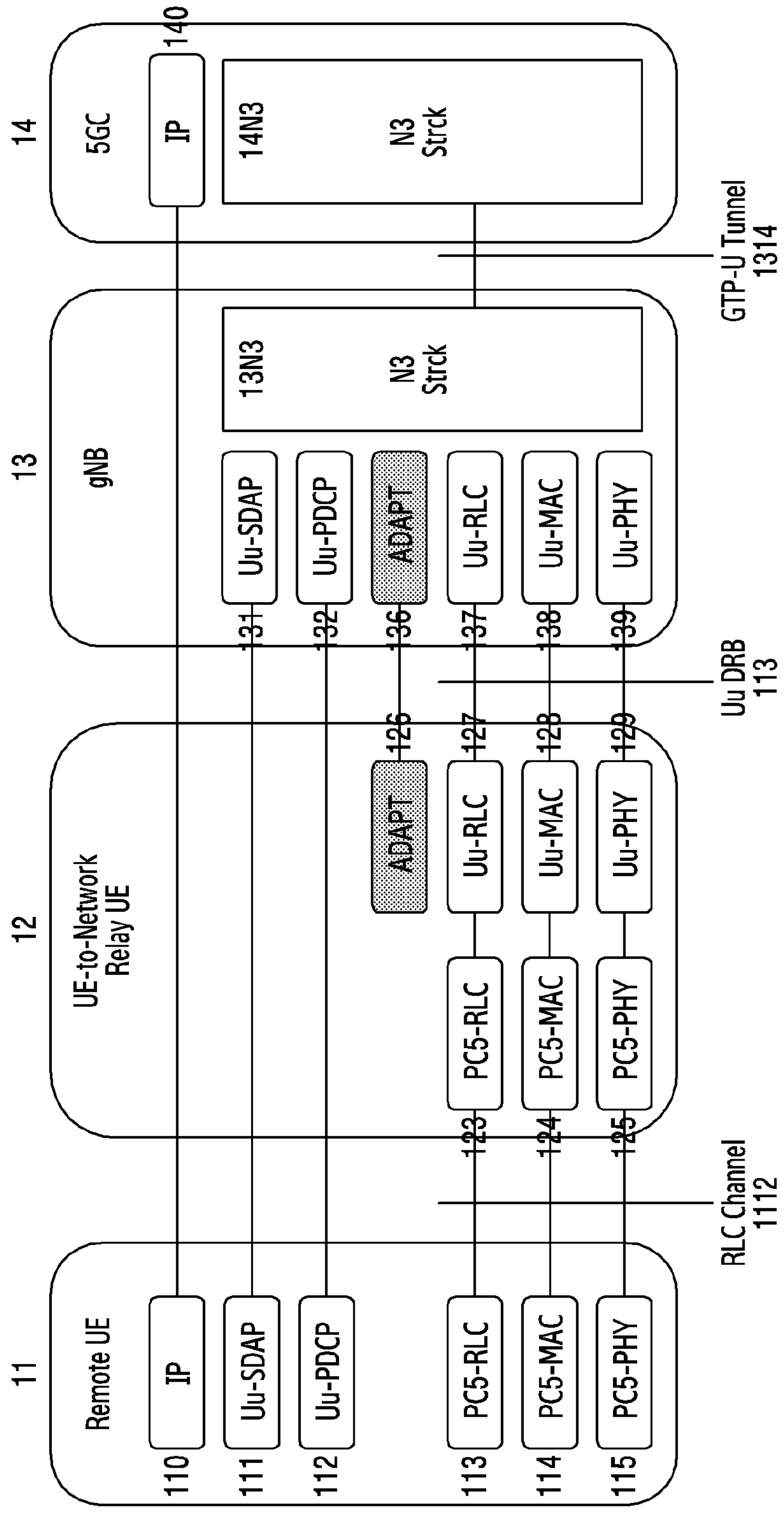
FIG. 1 illustrates a user plane protocol stack for L2 UE-to-NW relay.
Figure 2:
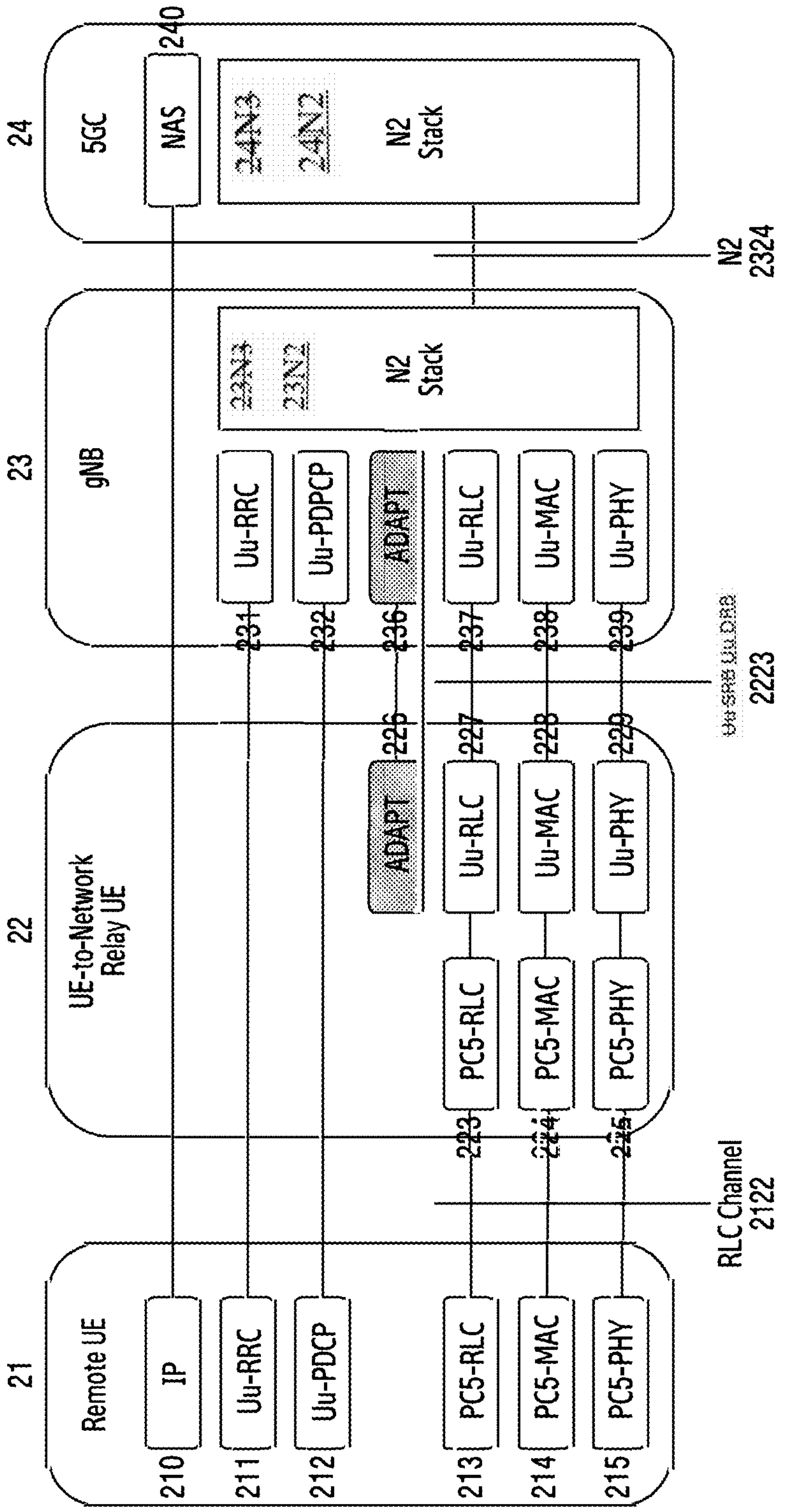
FIG. 2 illustrates a control plane protocol stack for L2 UE-to-NW relay.

FIGS. 1 and 2 respectively show user and control plane protocol stacks 1, 2 for L2 UE-to-NW relay, as captured in the 3GPP TR 38.836v17.0.0. 3GPP agreed to introduce the Adapt layer on the Uu link (link between relay UE 12, 22 and the gNB 13, 23), as shown in the above figures in shaded boxes. Presence of a separate Adapt layer on the sidelink (SL) i.e., PC5 link (between remote UE and relay UE) has also been confirmed by 3GPP RAN2 (but is not shown in the above diagrams). The main agreed functionality of Adapt is mapping of UL PC5 bearers onto Uu bearers, and performing the inverse process on the DL.

This Adapt layer was recently (re)named sidelink relay adaptation protocol, or SRAP for short. As captured in R2-2201996 (the most recent version of TS 38.351 specification draft, capturing SRAP), the following is the basic model and operation of SRAP as agreed by 3GPP:

- On the U2N relay UE 12, 22, the SRAP sublayer contains one SRAP entity at Uu interface and a separate collocated SRAP entity at the PC5 interface. On the U2N remote UE 11, 21, the SRAP sublayer contains only one SRAP entity at the PC5 interface;
- Each SRAP entity has a transmitting part and a receiving part. Across the PC5 interface, the transmitting part of the SRAP entity at the U2N remote UE 11, 21 has a corresponding receiving part of an SRAP entity at the U2N relay UE 12, 22, and vice-versa. Across the Uu interface, the transmitting part of the SRAP entity 126, 226 at the U2N relay UE 12, 22 has a corresponding receiving part of an SRAP entity 136, 236 at the gNB, and vice-versa;
- At the remote UE 11, 21, in the uplink (UL) direction the SRAP may determine SRAP UE ID and BEARER ID and add the SRAP header. At the remote UE 11, 21, on the downlink (DL), the SRAP may remove the SRAP header and deliver the packet to higher layers; and At the relay UE 12, 22, on the UL the SRAP may map the packet from a PC5 channel to a Uu channel using the SRAP UE ID and BEARER ID contained in the packet itself, and the mapping configuration provided by the network. At the relay UE 12, 22, on the DL the SRAP may map the packet from a Uu channel to a PC5 channel using SRAP UE ID and BEARER ID contained in the packet itself, and the mapping configuration provided by the network.

However, there remains a need to improve handling of configuration cases in sidelink relay networks.

FIG. 1 illustrates a user plane protocol stack 1 for L2 UE-to-NW relay.

In more detail, the user plane protocol stack 1 comprises a remote UE 11, a UE-to-Network relay UE 12, a gNB 13 and a 5GC 14.

The remote UE 11 comprises an IP entity 110, a Uu-SDAP entity 111 on a SDAP sublayer and a Uu-PDCP entity 112 on a PDCP sublayer. The remote UE 21 comprises a PC5-RLC entity 113 on a RLC sublayer, a PC5-MAC entity 114 on a MAC sublayer and a PC5-PHY entity 115 on a PHY sublayer. It should be understood that the sublayers (also known as layers) are of the network.

The UE-to-Network relay UE 12 comprises a PC5-RLC entity 123 on the RLC sublayer, a PC5-MAC entity 124 on the MAC sublayer and a PC5-PHY entity 125 on the PHY sublayer, respectively communicatively interfaced with the corresponding PC5-RLC entity 113, PC5-MAC entity 114 and PC5-PHY entity 115 of the remote UE 11 via a RLC channel 1112. The UE-to-Network relay UE 12 comprises an ADAPT entity 126 on an ADAPT layer, a Uu-RLC entity 127 on the RLC sublayer, a Uu-MAC entity 128 on the MAC sublayer and a Uu-PHY entity 129 on the PHY sublayer.

The gNB 13 comprises a Uu-SDAP entity 131 on the SDAP sublayer and a Uu-PDCP entity 132 on the PDCP sublayer, respectively communicatively interfaced with the corresponding Uu-SDAP entity 111 and Uu-PDCP entity 112 of the remote UE 11. The gNB 13 comprises an ADAPT entity 136 on the ADAPT layer, a Uu-RLC entity 137 on the RLC sublayer, a Uu-MAC entity 138 on the MAC sublayer and a Uu-PHY entity 139 on the PHY sublayer, respectively communicatively interfaced with the corresponding ADAPT entity 126, Uu-RLC entity 127, Uu-MAC entity 128 and Uu-PHY entity 129 of the UE-to-Network relay UE 12 via a Uu DRB 1213. The gNB 13 comprises a N3 Stack 13N3.

The 5GC 14 comprises an IP entity 140, communicatively interfaced with the corresponding IP entity 110 of the remote UE 11. The 5GC 14 comprises a N3 Stack 14N3, communicatively interfaced with the corresponding N3 Stack 13N3 of the gNB 13 via a GTP-U tunnel 1314.

FIG. 2 illustrates a control plane protocol stack 2 for L2 UE-to-NW relay.

In more detail, the Control plane protocol stack 2 comprises a remote UE 21, a UE-to-Network relay UE 22, a gNB 23 and a 5GC 24.

The remote UE 21 comprises a NAS entity 210, a Uu-RRC entity 211 on a RRC sublayer and a Uu-PDCP entity 212 on a PDCP sublayer. The remote UE 21 comprises a PC5-RLC entity 213 on a RLC sublayer, a PC5-MAC entity 214 on a MAC sublayer and a PC5-PHY entity 215 on a PHY sublayer. It should be understood that the sublayers (also known as layers) are of the network.

The UE-to-Network relay UE 22 comprises a PC5-RLC entity 223 on the RLC sublayer, a PC5-MAC entity 224 on the MAC sublayer and a PC5-PHY entity 225 on the PHY sublayer, respectively communicatively interfaced with the corresponding PC5-RLC entity 213, PC5-MAC entity 214 and PC5-PHY entity 215 of the remote UE 21 via a RLC channel 2112. The UE-to-Network relay UE 22 comprises an ADAPT entity 226 on an ADAPT layer, a Uu-RLC entity 227 on the RLC sublayer, a Uu-MAC entity 228 on the MAC sublayer and a Uu-PHY entity 229 on the PHY sublayer.

The gNB 23 comprises a Uu-RRC entity 231 on the RRC sublayer and a Uu-PDCP entity 232 on the PDCP sublayer, respectively communicatively interfaced with the corresponding Uu-RRC entity 211 and Uu-PDCP entity 212 of the remote UE 21. The gNB 23 comprises an ADAPT entity 236 on the ADAPT layer, a Uu-RLC entity 237 on the RLC sublayer, a Uu-MAC entity 238 on the MAC sublayer and a Uu-PHY entity 239 on the PHY sublayer, respectively communicatively interfaced with the corresponding ADAPT entity 226, Uu-RLC entity 227, Uu-MAC entity 228 and Uu-PHY entity 229 of the UE-to-Network relay UE 22 via a Uu DRB 2223. The gNB 23 comprises a N2 Stack 23N2.

The 5GC 24 comprises an NAS entity 240, communicatively interfaced with the corresponding NAS entity 210 of the remote UE 21. The 5GC comprises a N2 Stack 24N2, communicatively interfaced with the corresponding N2 Stack 23N2 of the gNB 23 via a N2 2324.

FIGS. 1 and 2 respectively show user and control plane protocol stacks 1, 2 for L2 UE-to-NW relay. 3GPP agreed to introduce the Adapt layer on the Uu link (link between relay UE 12, 22 and the gNB 13, 23), as shown in the above figures in shaded boxes. Presence of a separate adapt layer on the sidelink (SL) i.e., PC5 link (between remote UE and relay UE) has also been confirmed by 3GPP RAN2 (but is not shown in the above diagrams). The main agreed functionality of Adapt is mapping of UL PC5 bearers onto Uu bearers, and performing the inverse process on the DL.

This adapt layer was recently (re)named sidelink relay adaptation protocol, or SRAP for short. The following is the basic model and operation of SRAP:

On the U2N relay UE 12, 22, the SRAP sublayer contains one SRAP entity at Uu interface and a separate collocated SRAP entity at the PC5 interface. On the U2N remote UE 11, 21, the SRAP sublayer contains only one SRAP entity at the PC5 interface;

Each SRAP entity has a transmitting part and a receiving part. Across the PC5 interface, the transmitting part of the SRAP entity at the U2N remote UE 11, 21 has a corresponding receiving part of an SRAP entity at the U2N relay UE 12, 22, and vice-versa. Across the Uu interface, the transmitting part of the SRAP entity 126, 226 at the U2N relay UE 12, 22 has a corresponding receiving part of an SRAP entity 136, 236 at the gNB, and vice-versa;

At the remote UE 11, 21, in the uplink (UL) direction the SRAP may determine SRAP UE ID and BEARER ID and add the SRAP header. At the remote UE 11, 21, on the downlink (DL), the SRAP may remove the SRAP header and deliver the packet to higher layers; and At the relay UE 12, 22, on the UL the SRAP may map the packet from a PC5 channel to a Uu channel using the SRAP UE ID and BEARER ID contained in the packet itself, and the mapping configuration provided by the network. At the relay UE 12, 22, on the DL the SRAP may map the packet from a Uu channel to a PC5 channel using SRAP UE ID and BEARER ID contained in the packet itself, and the mapping configuration provided by the network.

Figure 3:
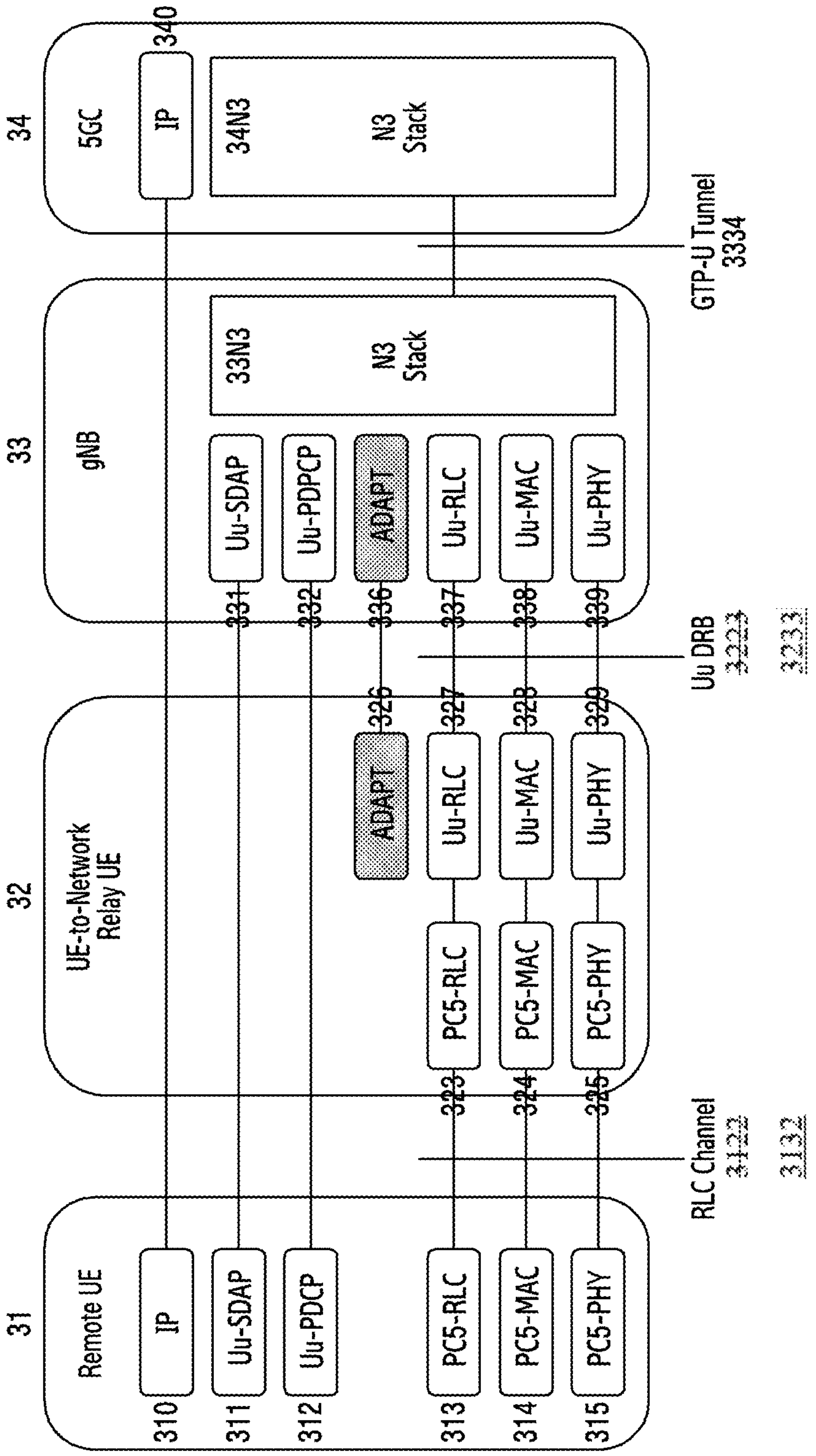
FIG. 3 illustrates a user plane protocol stack for L2 UE-to-NW relay according to an exemplary embodiment of the present disclosure.

FIG. 3 illustrates a user plane protocol stack 3 for L2 UE-to-NW relay, according to an exemplary embodiment of the present disclosure.

In more detail, the user plane protocol stack 3 comprises a remote UE 31, a UE-to-Network relay UE 32, a gNB 33 and a 5GC 34.

The remote UE 31 comprises an IP entity 310, a Uu-SDAP entity 311 on a SDAP sublayer and a Uu-PDCP entity 312 on a PDCP sublayer. The remote UE 21 comprises a PC5-RLC entity 313 on a RLC sublayer, a PC5-MAC entity 314 on a MAC sublayer and a PC5-PHY entity 315 on a PHY sublayer. It should be understood that the sublayers (also known as layers) are of the network.

The UE-to-Network relay UE 32 comprises a PC5-RLC entity 323 on the RLC sublayer, a PC5-MAC entity 324 on the MAC sublayer and a PC5-PHY entity 325 on the PHY sublayer, respectively communicatively interfaced with the corresponding PC5-RLC entity 313, PC5-MAC entity 314 and PC5-PHY entity 315 of the remote UE 31 via a RLC channel 3132. The UE-to-Network relay UE 32 comprises an ADAPT entity 326 on an ADAPT layer, a Uu-RLC entity 327 on the RLC sublayer, a Uu-MAC entity 328 on the MAC sublayer and a Uu-PHY entity 329 on the PHY sublayer.

The gNB 33 comprises a Uu-SDAP entity 331 on the SDAP sublayer and a Uu-PDCP entity 332 on the PDCP sublayer, respectively communicatively interfaced with the corresponding Uu-SDAP entity 311 and Uu-PDCP entity 312 of the remote UE 31. The gNB 33 comprises an ADAPT entity 336 on the ADAPT layer, a Uu-RLC entity 337 on the RLC sublayer, a Uu-MAC entity 338 on the MAC sublayer and a Uu-PHY entity 339 on the PHY sublayer, respectively communicatively interfaced with the corresponding ADAPT entity 326, Uu-RLC entity 327, Uu-MAC entity 328 and Uu-PHY entity 329 of the UE-to-Network relay UE 32 via a Uu DRB 3233. The gNB 33 comprises a N3 Stack 33N3.

The 5GC 34 comprises an IP entity 340, communicatively interfaced with the corresponding IP entity 310 of the remote UE 31. The 5GC 34 comprises a N3 Stack 34N3, communicatively interfaced with the corresponding N3 Stack 33N3 of the gNB 33 via a GTP-U tunnel 3334.

Figure 4:
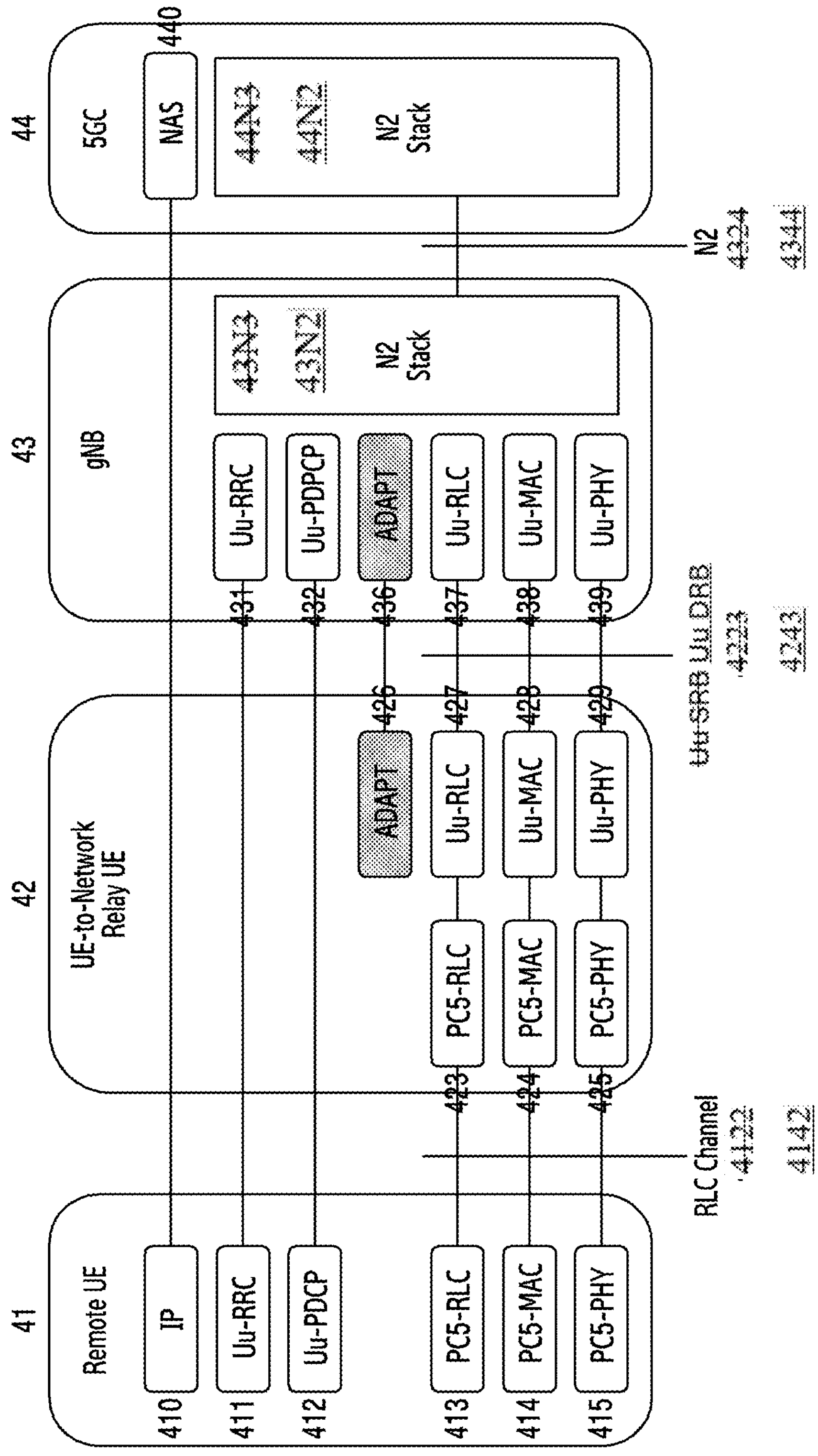
FIG. 4 illustrates a control plane protocol stack for L2 UE-to-NW relay according to an exemplary embodiment of the present disclosure.

FIG. 4 illustrates a control plane protocol stack 4 for L2 UE-to-NW relay according to an exemplary embodiment of the present disclosure.

In more detail, the control plane protocol stack 4 comprises a remote UE 41, a UE-to-Network relay UE 42, a gNB 43 and a 5GC 44.

The remote UE 41 comprises a NAS entity 410, a Uu-RRC entity 411 on a RRC sublayer and a Uu-PDCP entity 412 on a PDCP sublayer. The remote UE 41 comprises a PC5-RLC entity 413 on a RLC sublayer, a PC5-MAC entity 414 on a MAC sublayer and a PC5-PHY entity 415 on a PHY sublayer. It should be understood that the sublayers (also known as layers) are of the network.

The UE-to-Network relay UE 42 comprises a PC5-RLC entity 423 on the RLC sublayer, a PC5-MAC entity 424 on the MAC sublayer and a PC5-PHY entity 425 on the PHY sublayer, respectively communicatively interfaced with the corresponding PC5-RLC entity 413, PC5-MAC entity 414 and PC5-PHY entity 415 of the remote UE 41 via a RLC channel 4142. The UE-to-Network relay UE 42 comprises an ADAPT entity 426 on an ADAPT layer, a Uu-RLC entity 427 on the RLC sublayer, a Uu-MAC entity 428 on the MAC sublayer and a Uu-PHY entity 429 on the PHY sublayer.

The gNB 43 comprises a Uu-RRC entity 431 on the RRC sublayer and a Uu-PDCP entity 432 on the PDCP sublayer, respectively communicatively interfaced with the corresponding Uu-RRC entity 411 and Uu-PDCP entity 412 of the remote UE 41. The gNB 43 comprises an ADAPT entity 436 on the ADAPT layer, a Uu-RLC entity 437 on the RLC sublayer, a Uu-MAC entity 438 on the MAC sublayer and a Uu-PHY entity 439 on the PHY sublayer, respectively communicatively interfaced with the corresponding ADAPT entity 426, Uu-RLC entity 427, Uu-MAC entity 428 and Uu-PHY entity 429 of the UE-to-Network relay UE 42 via a Uu DRB 4243. The gNB 43 comprises a N2 Stack 43N2.

The 5GC 44 comprises an NAS entity 440, communicatively interfaced with the corresponding NAS entity 410 of the remote UE 41. The 5GC comprises a N2 Stack 44N2, communicatively interfaced with the corresponding N2 Stack 43N2 of the gNB 43 via a N2 4344.

In more detail, this present disclosure deals with handling of unknown, unforeseen, and erroneous protocol data.

Handling of Error Cases and Misconfiguration at Remote UE 31, 41:

- At remote UE 31, 41, if a packet is received with UE ID not matching that UE, the packet is discarded; and
- At remote UE 31, 41, if a packet is received with UE ID matching that UE but whose bearer ID does not match any bearer for that UE, the packet is discarded.

Handling of Error Cases and Misconfiguration at Relay UE 32, 42:

- At relay UE 32, 42, if a packet is received whose UE ID does not appear in the configuration table, the packet is discarded;
- At relay UE 32, 42, if a packet is received whose UE ID appears in the configuration table but the relevant entries do not match the BEARER ID, the packet is discarded;
- At relay UE 32, 42, if a packet is received whose UE ID appears in the configuration table but the relevant entries do not match the BEARER ID, the packet is sent on a default channel. This default channel can be part of the initial relay UE 32, 42 configuration by the network, and can also be re-configurable:
  - In an embodiment of this present disclosure, the default channel is a dedicated, pre-configured and/or configurable mapping between an RLC channel ID (=the default channel) and one or more E2E bearer IDs (identified by the BEARER ID in the SRAP packet). In a refinement of this embodiment, there is an explicit indication about default channel for this erroneous case to distinguish the erroneous case from normal use case contained in the E2E bearer<->RLC channel configuration (i.e., relay UE 32, 42 SRAP configuration);
- At relay UE 32, 42, if a packet is received whose UE ID appears in the configuration table and multiple entries match the BEARER ID, and a prioritization is configured among these multiple entries (e.g., by the network), the packet is sent on a channel chosen in descending order of priority of the matched entries;
- At relay UE 32, 42, if a packet is received whose UE ID appears in the configuration table and multiple entries match the BEARER ID, the packet is sent on a channel randomly chosen by the relay UE 32, 42;
- At relay UE 32, 42, if a packet is received whose UE ID appears in the configuration table and multiple entries match the BEARER ID, the packet is sent on a channel with conditions which match the QoS requirements e.g., priority, BER, PER, delay requirements/packet delay budget;

At relay UE 32, 42, if a packet is received whose UE ID appears in the configuration table and a single entry matches the BEARER ID but the determined egress link is in RLF (Radio Link Failure, i.e., unavailable), the packet is discarded;

At relay UE 32, 42, if a packet is received whose UE ID appears in the configuration table and a single entry matches the BEARER ID but the determined egress link is congested (i.e., technically available but overloaded), the packet is discarded;

At relay UE 32, 42, if a packet is received whose UE ID appears in the configuration table and a single entry matches the BEARER ID but the determined egress link is congested (i.e., technically available but overloaded), the packet is discarded (or not) depending on its related QoS requirements (e.g., if the packet may soon expire, or if the packet delay budget is unlikely to be met);

At relay UE 32, 42, if a packet is received whose UE ID appears in the configuration table and a single entry matches the BEARER ID but relay UE 32, 42 is to change its serving cell due to RRCReconfiguration (including the reconfigurationWithSync), the packet is discarded;

In a refinement, upon Uu RLF detection/notification or upon reception of an RRCReconfiguration including the reconfigurationWithSync, relay UE 32, 42 removes the configuration table;

Alternatives/enhancements for above Uu RLF and handover case, to cover any possibility that relay UE 32, 42 has packets buffered for transmission immediately before removing the configuration table due to Uu RLF/handover:

- At relay UE 32, 42, if a packet is received whose UE ID appears in the configuration table and a single entry matches the BEARER ID but the determined egress link is in RLF (i.e., unavailable), the packet is forwarded to remote UE 31, 41 or gNB 33, 43 before removing the configuration table, and
- At relay UE 32, 42, if a packet is received whose UE ID appears in the configuration table and a single entry matches the BEARER ID but relay UE 32, 42 is to change its serving cell due to RRCReconfiguration including the reconfigurationWithSync, the packet is forwarded to remote UE 31, 41 or gNB 33, 43 before removing the configuration table;

At relay UE 32, 42 (applies to DL only), if a packet is received whose UE ID appears in the configuration table and a single entry matches the BEARER ID but the determined egress link is in RLF (i.e., unavailable), the packet is re-routed via a different remote UE 31, 41;

At relay UE 32, 42 (applies to DL only), if a packet is received whose UE ID appears in the configuration table and a single entry matches the BEARER ID but relay UE 32, 42 is to change its serving cell due to RRCReconfiguration including the reconfiguration-WithSync, the packet is re-routed via a different remote UE 31, 41;

In case of PC5 RLF or Uu RLF notification from relay UE 32, 42, or relay UE 32, 42's serving cell change (RRCReconfiguration including the reconfiguration-WithSync) notification from relay UE 32, 42 or PC5 RRC release by upper layer request, SRAP entity at remote UE 31, 41 is released; and In case of PC5 RLF or Uu RLF or relay UE's 32, 42 serving cell change (RRCReconfiguration including the reconfigurationWithSync) or PC5 RRC release by upper layer request, SRAP entity at relay UE 32, 42 is released.

The first aspect provides a method of handling communication in a sidelink relay network, including the remote UE 31, 41 and the relay UE 32, 42, the method comprising: handling, by the remote UE 31, 41 and/or the relay UE 32, 42, an error and/or a misconfiguration.

Optionally, in this example, handling, by the remote UE 31, 41 and/or the relay UE 32, 42, the error and/or the misconfiguration comprises discarding, by the remote UE 31, 41, a packet received thereby if a UE ID of the packet does not match the ID of the remote UE 31, 41.

Optionally, in this example, handling, by the remote UE 31, 41 and/or the relay UE 32, 42, the error and/or the misconfiguration comprises discarding, by the remote UE 31, 41, a packet received thereby if a bearer ID of the packet does not match a bearer for the remote UE 31, 41.

Optionally, in this example, handling, by the remote UE 31, 41 and/or the relay UE 32, 42, the error and/or the misconfiguration comprises discarding, by the relay UE 32, 42, a packet received thereby if a UE ID of the packet is not included in a configuration table.

Optionally, in this example, handling, by the remote UE 31, 41 and/or the relay UE 32, 42, the error and/or the misconfiguration comprises discarding, by the relay UE 32, 42, a packet received thereby if a UE ID of the packet is included in a configuration table and if a bearer ID of the packet does not match a bearer included in the configuration table for the UE ID.

Optionally, in this example, handling, by the remote UE 31, 41 and/or the relay UE 32, 42, the error and/or the misconfiguration comprises sending, by the relay UE 32, 42, a packet received thereby on a default channel if a UE ID of the packet is included in a configuration table and if a bearer ID of the packet does not match a bearer included in the configuration table for the UE ID.

Optionally, in this example, the default channel is a dedicated, pre-configured and/or configurable mapping between an RLC channel ID (i.e., the default channel) and one or more E2E bearer IDs.

Optionally, in this example, handling, by the remote UE 31, 41 and/or the relay UE 32, 42, the error and/or the misconfiguration comprises sending, by the relay UE 32, 42, a packet received thereby on a channel selected based on prioritization if a UE ID of the packet is included in a configuration table and if a bearer ID of the packet matches a plurality of bearers included in the configuration table for the UE ID.

Optionally, in this example, handling, by the remote UE 31, 41 and/or the relay UE 32, 42, the error and/or the misconfiguration comprises sending, by the relay UE 32, 42, a packet received thereby on a channel selected randomly if a UE ID of the packet is included in a configuration table and if a bearer ID of the packet matches a plurality of bearers included in the configuration table for the UE ID.

Optionally, in this example, handling, by the remote UE 31, 41 and/or the relay UE 32, 42, the error and/or the misconfiguration comprises sending, by the relay UE 32, 42, a packet received thereby on a channel selected based on QoS requirements if a UE ID of the packet is included in a configuration table and if a bearer ID of the packet matches a plurality of bearers included in the configuration table for the UE ID.

Optionally, in this example, handling, by the remote UE 31, 41 and/or the relay UE 32, 42, the error and/or the misconfiguration comprises selectively discarding, by the relay UE 32, 42, a packet received thereby if a UE ID of the packet is included in a configuration table and if a bearer ID of the packet matches a bearer included in the configuration table for the UE ID and if a determined egress link is in RLF or congested.

Optionally, in this example, handling, by the remote UE 31, 41 and/or the relay UE 32, 42, the error and/or the misconfiguration comprises discarding, by the relay UE 32, 42, a packet received thereby if a UE ID of the packet is included in a configuration table and if a bearer ID of the packet matches a bearer included in the configuration table for the UE ID and if the relay UE 32, 42 is to change its serving cell, for example due to RRCReconfiguration.

Optionally, in this example, handling, by the remote UE 31, 41 and/or the relay UE 32, 42, the error and/or the misconfiguration comprises removing, by the relay UE 32, 42, a configuration table upon Uu RLF detection/notification or upon reception of an RRCReconfiguration including the reconfigurationWithSync.

Optionally, in this example, handling, by the remote UE 31, 41 and/or the relay UE 32, 42, the error and/or the misconfiguration comprises forwarding, by the relay UE 32, 42, a buffered packet before removing, by the relay UE 32, 42, a configuration table.

Optionally, in this example, handling, by the remote UE 31, 41 and/or the relay UE 32, 42, the error and/or the misconfiguration comprises re-routing via a different remote UE 31, 41, by the relay UE 32, 42, a packet received thereby if a UE ID of the packet is included in a configuration table and if a bearer ID of the packet matches a bearer included in the configuration table for the UE ID and if a determined egress link is in RLF or if the relay UE 32, 42 is to change its serving cell, for example due to RRCReconfiguration.

Optionally, in this example, handling, by the remote UE 31, 41 and/or the relay UE 32, 42, the error and/or the misconfiguration comprises releasing, at the relay UE 32, 42, a SRAP entity.

The second aspect provides a sidelink relay network, including a remote UE 31, 41 and a relay UE 32, 42, configured to implement a method according to the first aspect.

Figure 5:
FIG. 5 illustrates a method according to an exemplary embodiment of the present disclosure.

FIG. 5 illustrates a method according to an exemplary embodiment of the present disclosure.

The method is of handling communication in a sidelink relay network, including the remote UE and the relay UE, the method comprising:

at step 501, handling, by the remote UE and/or the relay UE, an error and/or a misconfiguration.

The method may include any of the steps described with respect to the first aspect.

Figure 6:
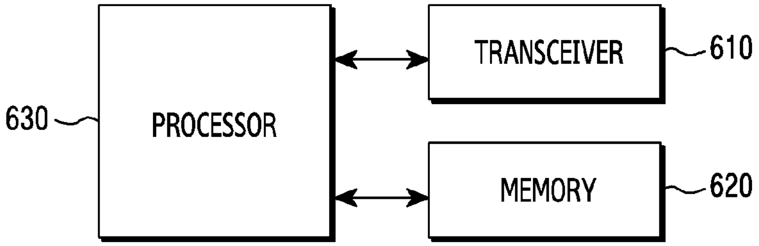
FIG. 6 illustrates a remote user equipment (UE) according to an embodiment of the present disclosure.

FIG. 6 illustrates a remote user equipment (UE) according to an embodiment of the present disclosure.

As shown in FIG. 6, a remote UE according to an embodiment may include a transceiver 610, a memory 620, and a processor (or a controller) 630. The transceiver 610, the memory 620, and the processor (or controller) 630 of the remote UE may operate according to a communication method of the remote UE described above. However, the components of the remote UE are not limited thereto. For example, the remote UE may include more or fewer components than those described in FIG. 6. In addition, the processor (or controller) 630, the transceiver 610, and the memory 620 may be implemented as a single chip. Also, the processor (or controller) 630 may include at least one processor.

The transceiver 610 collectively refers to a remote UE receiver and a remote UE transmitter, and may transmit/receive a signal to/from a base station, a relay UE, or another remote UE. The signal transmitted or received to or from the remote UE may include control information and data. The transceiver 610 may include a RF transmitter for up-converting and amplifying a frequency of a transmitted signal, and a RF receiver for amplifying low-noise and down-converting a frequency of a received signal. However, this is only an example of the transceiver 610 and components of the transceiver 610 are not limited to the RF transmitter and the RF receiver.

Also, the transceiver 610 may receive and output, to the processor (or controller) 630, a signal through a wireless channel, and transmit a signal output from the processor (or controller) 630 through the wireless channel.

The memory 620 may store a program and data required for operations of the remote UE. Also, the memory 620 may store control information or data included in a signal obtained by the remote UE. The memory 620 may be a storage medium, such as read-only memory (ROM), random access memory (RAM), a hard disk, a CD-ROM, and a DVD, or a combination of storage media.

The processor (or controller) 630 may control a series of processes such that the remote UE operates as described above. For example, the processor (or controller) 630 may receive a data signal and/or a control signal, and the processor (or controller) 630 may determine a result of receiving the signal transmitted by a base station, a relay UE, and/or another remote UE.

Figure 7:
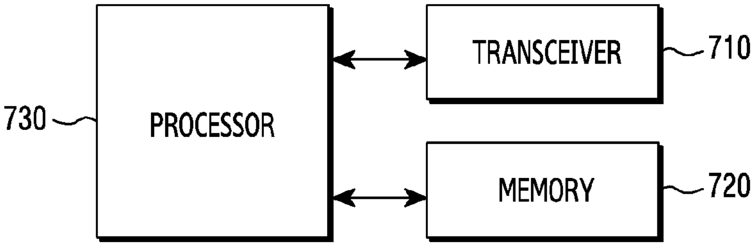
FIG. 7 illustrates a relay UE according to an embodiment of the present disclosure.

FIG. 7 illustrates a relay UE according to an embodiment of the present disclosure.

As shown in FIG. 7, a relay UE according to an embodiment may include a transceiver 710, a memory 720, and a processor (or a controller) 730. The transceiver 710, the memory 720, and the processor (or controller) 730 of the relay UE may operate according to a communication method of the relay UE described above. However, the components of the relay UE are not limited thereto. For example, the relay UE may include more or fewer components than those described in FIG. 7. In addition, the processor (or controller) 730, the transceiver 710, and the memory 720 may be implemented as a single chip. Also, the processor (or controller) 730 may include at least one processor.

The transceiver 710 collectively refers to a relay UE receiver and a relay UE transmitter, and may transmit/receive a signal to/from a base station, a remote UE, or another relay UE. The signal transmitted or received to or from the relay UE may include control information and data. The transceiver 710 may include a RF transmitter for up-converting and amplifying a frequency of a transmitted signal, and a RF receiver for amplifying low-noise and down-converting a frequency of a received signal. However, this is only an example of the transceiver 710 and components of the transceiver 710 are not limited to the RF transmitter and the RF receiver.

Also, the transceiver 710 may receive and output, to the processor (or controller) 730, a signal through a wireless channel, and transmit a signal output from the processor (or controller) 730 through the wireless channel.

The memory 720 may store a program and data required for operations of the relay UE. Also, the memory 720 may store control information or data included in a signal obtained by the relay UE. The memory 720 may be a storage medium, such as read-only memory (ROM), random access memory (RAM), a hard disk, a CD-ROM, and a DVD, or a combination of storage media.

The processor (or controller) 730 may control a series of processes such that the relay UE operates as described above. For example, the processor (or controller) 730 may receive a data signal and/or a control signal, and the processor (or controller) 730 may determine a result of receiving the signal transmitted by a base station, a remote UE, and/or another relay UE.

Figure 8:
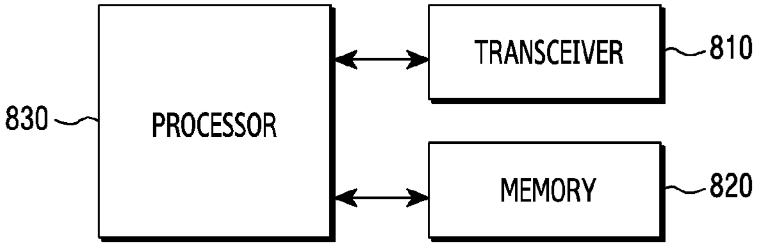
FIG. 8 illustrates a base station (or a gNodeB (gNB)) according to an embodiment of the present disclosure.

FIG. 8 illustrates a base station (or a gNodeB (gNB)) according to an embodiment of the present disclosure.

As shown in FIG. 8 is, the base station of the present disclosure may include a transceiver 810, a memory 820, and a processor (or, a controller) 830. The transceiver 810, the memory 820, and the processor (or controller) 830 of the base station may operate according to a communication method of the base station described above. However, the components of the base station are not limited thereto. For example, the base station may include more or fewer components than those described in FIG. 8. In addition, the processor (or controller) 830, the transceiver 810, and the memory 820 may be implemented as a single chip. Also, the processor (or controller) 830 may include at least one processor.

The transceiver 810 collectively refers to a base station receiver and a base station transmitter, and may transmit/receive a signal to/from a UE (or a relay UE), another base station, and/or a core network function(s) (or entity(s)). The signal transmitted or received to or from the base station may include control information and data. The transceiver 810 may include a RF transmitter for up-converting and amplifying a frequency of a transmitted signal, and a RF receiver for amplifying low-noise and down-converting a frequency of a received signal. However, this is only an example of the transceiver 810 and components of the transceiver 810 are not limited to the RF transmitter and the RF receiver.

Also, the transceiver 810 may receive and output, to the processor (or controller) 830, a signal through a wireless channel, and transmit a signal output from the processor (or controller) 830 through the wireless channel.

The memory 820 may store a program and data required for operations of the base station. Also, the memory 820 may store control information or data included in a signal obtained by the base station. The memory 820 may be a storage medium, such as ROM, RAM, a hard disk, a CD-ROM, and a DVD, or a combination of storage media.

The processor (or controller) 830 may control a series of processes such that the base station operates as described above. For example, the processor (or controller) 830 may receive a data signal and/or a control signal, and the processor (or controller) 830 may determine a result of receiving the signal transmitted by the UE (or a relay UE) and/or the core network function.

Figure 9:
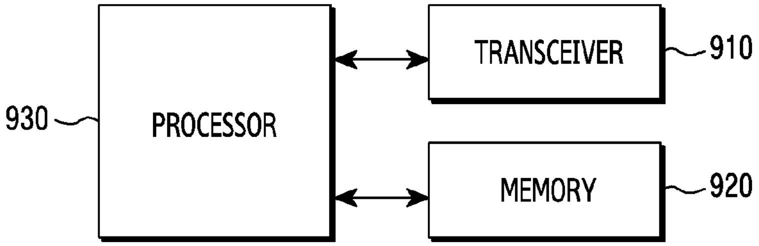
FIG. 9 illustrates a core network (or 5G core network (5GC)) according to an embodiment of the present disclosure.

FIG. 9 illustrates a core network (or 5G core network (5GC)) according to an embodiment of the present disclosure.

As shown in FIG. 9 is, the base station of the present disclosure may include a transceiver 910, a memory 920, and a processor (or, a controller) 930. The transceiver 910, the memory 920, and the processor (or controller) 930 of the base station may operate according to a communication method of the base station described above. However, the components of the base station are not limited thereto. For example, the base station may include more or fewer components than those described in FIG. 9. In addition, the processor (or controller) 930, the transceiver 910, and the memory 920 may be implemented as a single chip. Also, the processor (or controller) 930 may include at least one processor.

The transceiver 910 collectively refers to a base station receiver and a base station transmitter, and may transmit/receive a signal to/from a base station, and/or another core network function(s) (or entity(s)). The signal transmitted or received to or from the base station may include control information and data. The transceiver 910 may include a RF transmitter for up-converting and amplifying a frequency of a transmitted signal, and a RF receiver for amplifying low-noise and down-converting a frequency of a received signal. However, this is only an example of the transceiver 910 and components of the transceiver 910 are not limited to the RF transmitter and the RF receiver.

Also, the transceiver 910 may receive and output, to the processor (or controller) 930, a signal through a wireless channel, and transmit a signal output from the processor (or controller) 930 through the wireless channel.

The memory 920 may store a program and data required for operations of the base station. Also, the memory 920 may store control information or data included in a signal obtained by the base station. The memory 920 may be a storage medium, such as ROM, RAM, a hard disk, a CD-ROM, and a DVD, or a combination of storage media.

The processor (or controller) 930 may control a series of processes such that the base station operates as described above. For example, the processor (or controller) 930 may receive a data signal and/or a control signal, and the processor (or controller) 930 may determine a result of receiving the signal transmitted by the base station and/or another core network function.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the present disclosure.

Although a preferred embodiment has been shown and described, it will be appreciated by those skilled in the art that various changes and modifications might be made without departing from the scope of the present disclosure, as defined in the appended claims and as described above.

At least some of the example embodiments described herein may be constructed, partially or wholly, using dedicated special-purpose hardware. Terms such as "component," "module" or "unit" used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The present disclosure is not restricted to the details of the foregoing embodiment(s). The present disclosure extends to any novel one, or any novel combination, of the features disclosed in this specification (including any accompanying claims, abstract and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a relay user equipment (UE) communicating with a remote UE in a wireless communication system, the method comprising:

receiving, at a sidelink relay adaptation protocol (SRAP) layer of the relay UE, an SRAP protocol data unit (PDU);

identifying a UE identity and a bearer identity included in an SRAP header of the SRAP PDU;

identifying that the UE identity and the bearer identity included in the SRAP header of the SRAP PDU match with a configuration for the relay UE, wherein the configuration includes a list of mapping between the bearer identity and a radio link control (RLC) channel; and based on the identification that the UE identity and the bearer identity match with the configuration for the relay UE and the relay UE is to change a serving cell based on a radio resource control (RRC) reconfiguration including a reconfiguration with sync configuration, discarding the SRAP PDU at the SRAP layer of the relay UE, forwarding a buffered packet, and removing the configuration for the relay UE.

2. The method of claim 1, further comprising:

if the UE identity included in the SRAP header of the SRAP PDU is included in a configuration table and the bearer identity included in the SRAP header of the SRAP PDU does not match a bearer included in the configuration table for the UE identity, discarding the SRAP PDU.

3. A relay user equipment (UE) communicating with a remote UE in a wireless communication system, the relay UE comprising:

at least one transceiver;

at least one processor communicatively coupled to the at least one transceiver; and at least one memory, communicatively coupled to the at least one processor, storing instructions executable by the at least one processor individually or in any combination to cause the relay UE to:

receive, at a sidelink relay adaptation protocol (SRAP) layer of the relay UE, an SRAP protocol data unit (PDU), identify a UE identity or a bearer identity included in an SRAP header of the SRAP PDU, identify that the UE identity and the bearer identity included in the SRAP header of the SRAP PDU match with a configuration for the relay UE, wherein the configuration includes a list of mapping between the bearer identity and a radio link control (RLC) channel, and based on the identification that the UE identity and the bearer identity match with the configuration for the relay UE and the relay UE is to change a serving cell based on a radio resource control (RRC) reconfiguration including a reconfiguration with sync configuration, discard the SRAP PDU at the SRAP layer of the relay UE, forward a buffered packet, and remove the configuration for the relay UE.

4. The relay UE of claim 3, the at least one processor is further configured to:

if the UE identity included in the SRAP header of the SRAP PDU is included in a configuration table and the bearer identity included in the SRAP header of the SRAP PDU does not match with a bearer included in the configuration table for the UE identity, discard the SRAP PDU.

* * * * *